(12) United States Patent  (10) Patent No.: US 9,101,902 B2
Jo et al.  (45) Date of Patent: Aug. 11, 2015

(54) SOL-GEL KIT FOR PREPARING BIOCHIP AND METHOD FOR PREPARING BIOCHIP USING THE SAME

(75) Inventors: Minjoung Jo, Seoul (KR); Seram Lee, Seoul (KR)

(73) Assignee: PCL, Inc. (KR)

(*) Notice: Subject to any disclaimer, the term of this patent is extended or adjusted under 35 U.S.C. 154(b) by 0 days.

(21) Appl. No.: 13/096,991

(22) Filed: Apr. 28, 2011

(65) Prior Publication Data

US 2012/0277108 A1  Nov. 1, 2012

(30) Foreign Application Priority Data

Apr. 27, 2011 (KR) .................. 10-2011-0039535

(51) Int. Cl.
*B01J 19/00* (2006.01)
(52) U.S. Cl.
CPC .... *B01J 19/0046* (2013.01); *B01J 2219/00315* (2013.01); *B01J 2219/00364* (2013.01); *B01J 2219/00385* (2013.01); *B01J 2219/00637* (2013.01); *B01J 2219/00644* (2013.01); *B01J 2219/00725* (2013.01)

(58) Field of Classification Search
None
See application file for complete search history.

(56) References Cited

U.S. PATENT DOCUMENTS

2006/0121474 A1* 6/2006 Kim et al. ..................... 435/6
2006/0223167 A1* 10/2006 Chaton et al. ............. 435/287.2
2006/0227466 A1* 10/2006 Yagami ..................... 360/324.2
2009/0227466 A1* 9/2009 Kim ................................. 506/9

FOREIGN PATENT DOCUMENTS

CA  WO-2010/135834 A1 * 12/2010 ............ 435/18
WO  WO 2010/135834 A1  12/2010

OTHER PUBLICATIONS

Dave et al., "Sol-Gel Encapsulation Methods for Biosensors", Anal. Chem., Nov. 15, 1994, p. 1120, vol. 66, No. 22.
Edminston et al., "Spectroscopic Characterization of Albumin and Myoglobin Entrapped Bulk Sol-Gel Glasses", J. Coll. Interf. Sci., 1994, pp. 395-406, vol. 163.
Gill et al., "Bioencapsulation within synthetic polymers (Part 1): sol-gel encapsulated biologicals", TIBTECH, Jul. 2000, p. 282, vol. 18.
MacBeath et al., Printing Proteins as Microarrays for High-Throughput Function Determination, Science, Sep. 8, 2000, p. 1760, vol. 28.
Kim et al., "Polymer microstructures formed by moulding in capillaries", Nature, Aug. 17, 1995, p. 581, vol. 376, No. 17.
Kim et al., "Stable Sol-Gel Microstructured and Microfluidic Networks for Protein Patterning", Biotechnol. Bioeng., 2001, pp. 331 to 337, vol. 73.
Marzolin et al., "Communications", Advanced Materials, 1998, pp. 571, vol. 10, No. 8.
Reetz et al., "Entrapment of Biocatalysts in Hydrophobic Sol-Gel Materials for Use in Organic Chemistry", Adv. Mater., 1997, p. 943, vol. 9, No. 12.
Schuller et al., "Fabrication of photonic crystal lasers by nanomolding of solgel glasses", Applied Optics, Sep. 20, 1999, p. 5799, vol. 38, No. 27.

* cited by examiner

*Primary Examiner* — Jennifer McDonald
*Assistant Examiner* — Valerie Toodle
(74) *Attorney, Agent, or Firm* — David P. Halstead; Foley Hoag LLP

(57) ABSTRACT

A method of preparing a protein chip by gelation of a sol composition. In the method, a mixture of specific silicate monomers, such as SolB1, SolB2 and SolB3, SolBH, and a mixture of SolBS, distilled water and a detector protein are mixed sequentially, so that the gelation rate of the sol composition can be delayed, thus inducing the stable gelation of the composition. Also, the biochip can be fabricated in a simple and easy manner by dispensing the sol composition by hand using an arrayer or a tool such as a pipette. In addition, a uniform biochip can be prepared by dispensing the sol composition, solution I (SolBH) and solution II (a mixture of buffer, SolBS, distilled water and a detector protein) sequentially onto a substrate without needing a conventional pretreatment process such as mixing.

16 Claims, 11 Drawing Sheets

FIG. 2
(A)
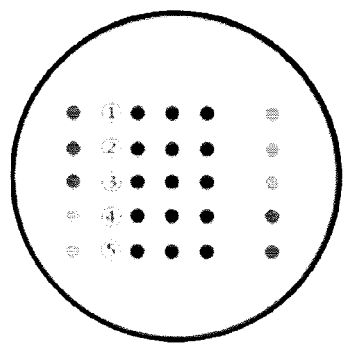
● : Five kinds of HIV markers ①, ②, ③, ④, ⑤
  : Negative Control (Bovine Serum Albumin)
● : Positive Control (Cy3)
(B)
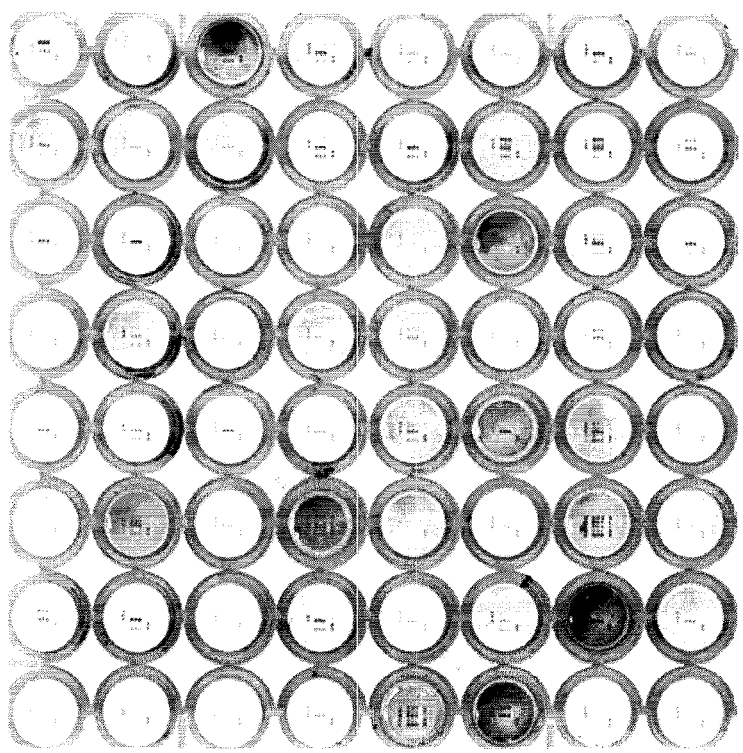

FIG. 5

| Standard sample | | Anti-HIV test | US FDA licensed anti-HIV tests | | | | | | HIV Ag (MAb) | Western blot |
|---|---|---|---|---|---|---|---|---|---|---|
| | | PCL, Inc. | Abbott | CBC | CPI | Gen.Sys. | Org.Tek. | Syva | Abbott | Ortho |
| Member I.D. | Days Since 1st Bleed | Results | Results | Results | Results | Results | Results | Results | Results | Results |
| PRB922-01 | 0 | POS | NEG | NEG | NEG | NEG | NEG | NEG | POS | NEG |
| PRB922-02 | 4 | POS | NEG | NEG | NEG | NEG | NEG | NEG | POS | NEG |
| PRB922-03 | 7 | POS | POS | POS | NEG | NEG | POS | POS | POS | NEG |
| PRB922-04 | 11 | POS | POS | POS | POS | NEG | POS | POS | POS | POS |

- Proteins Encapsulated
- Interacting Proteins or Antibodies Added from assay 10 minutes after preparation    3 hours after preparation

FIG. 12
1. Preparation of sol-gel chip
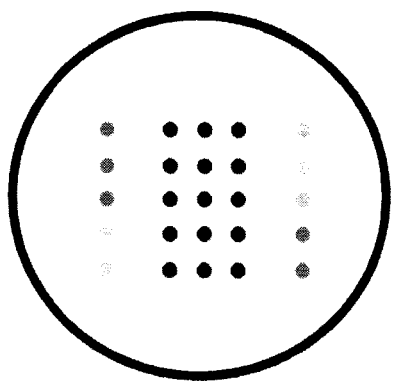 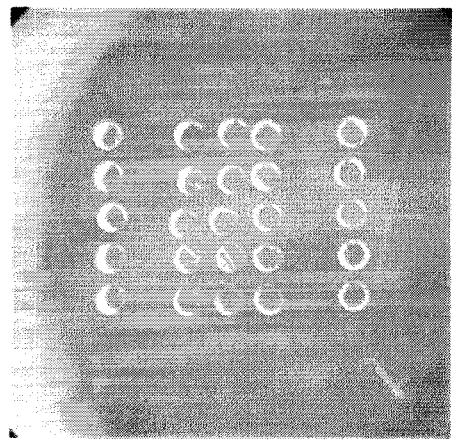
● : Five kinds of antigens against specific disease(HIV)
● : Negative Control (Bovine Serum Albumin)
● : Positive Control (Cy3)
2. Assay result using serum of HIV-infected patient
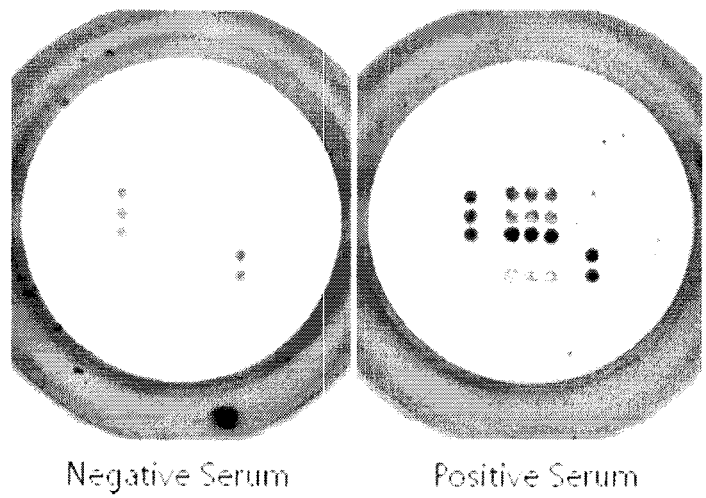
Negative Serum      Positive Serum ● : Bisphenol A
◌ : Negative Control (buffer solution)

Solution for Binding Assay

SolB™ Complete Kit

SOL-GEL KIT FOR PREPARING BIOCHIP AND METHOD FOR PREPARING BIOCHIP USING THE SAME

CROSS-REFERENCE TO RELATED APPLICATIONS

The present application claims priority under 35 U.S.C. 119 to Korean Patent Application No. 10-2011-0039535, filed on Apr. 27, 2011, the disclosure of which is expressly incorporated by reference herein in its entirety.

TECHNICAL FIELD

The present invention relates to a method for preparing a biochip in a simple manner either by using a sol composition, prepared by mixing specific solutions sequentially, or by dispensing such solutions sequentially directly onto a substrate without a pretreatment process, and to a sol-gel kit for preparing biochip.

BACKGROUND ART

Biochip technology is a representative example of a new technology based on a combination of nanotechnology (NT), biotechnology (BT) and information technology (IT). Biochips are high-density microarrays comprising a variety of biomaterials on the surface of a solid support and can be divided, according to the kind of biomaterial attached to the solid support surface, into a DNA ship, a protein chip, a cell chip, a neuron chip and the like. Also, a combination of biochip technology with microfluidic technology enables the development of LOC (lab-on-a-chip) technology. Biochip technology includes a technique of immobilizing a biomaterial, a technique of making a solid support compatible with a biomaterial, a technique of making biomaterial microarrays, an assay technique of performing various biological reactions on a prepared chip, a technique of detecting reaction results, protein engineering of making a biomaterial to be immobilized, a gene recombination technique, and the like.

A protein chip, a kind of biochip, is a high-density microarray comprising a variety of proteins on a unit area of the surface of a solid support. In recent years, there have been efforts to fabricate protein chips using the principles and techniques for fabricating commercially available DNA chips. In general, commercially available DNA chips are mostly fabricated by immobilizing DNA on a glass substrate, the surface of which has been pretreated with a coating material. When a protein chip is fabricated using a method similar to a method used to fabricate a DNA chip, that is, when a protein chip is fabricated by immobilizing proteins on a glass substrate, the surface of which has been pretreated with a coating material, various problems arise due to the difference in physical and chemical properties between the target proteins to be immobilized.

Previous protein chips were produced by immobilizing proteins on a surface-treated glass substrate and used to perform a simple binding assay. The performance of the protein chip was determined by the activity of the immobilized protein and it was hard to work successfully (MacBeath and Schreiber, *Science* 289:1760, 2000). Such problems are caused by the denaturation, inactivation and degradation of proteins resulting from the difference in the inherent physical and chemical properties of proteins. In order to overcome these problems, studies have been conducted on surface treatment technology for immobilizing proteins suitable for protein characteristics which are distinguished from those of DNA and on materials for immobilizing protein. Such studies are focused on a method for performing immobilization on the surface of a protein chip while maintaining the activity of the protein. Examples thereof include Hydrogel™-coated slide (PerkinElmer), Versalinx chip (Prolinx), PDC chip which is a biochip commercially available from Zyomyx, etc.

Meanwhile, a sol-gel process is a technology which has been used to make a micro-structure by microprocessing. Particularly, it is a technology comprised of forming a binding net by a mild process and immobilizing biomolecules within the binding net by methods other than a covalent bonding method, instead of chemically attaching biomolecules to an inorganic material (Gill, I. and Ballesteros, A., *Trends Biotechnol.*, 18:282, 2000).

Furthermore, many biomolecules, including enzymes, are immobilized on a mass sol-gel matrix and used to fabricate biocatalysts or biosensors (Reetz et al., *Adv. Mater.*, 9:943, 1997). Particularly, these biomolecules are also used in the detection of optical color development due to their transparent optical properties (Edminston et al., *J. Coll. Interf. Sci.*, 163:395, 1994). Also, biomolecules are known to be not only chemically but also thermally stabilized when they are immobilized on a sol-gel matrix (Dave et al., *Anal. Chem.*, 66:1120, 1994).

In the case of biosensors, the sol-gel reaction is used as a method for forming and patterning a microstructure on a solid support as well as for simple immobilization. In this regard, the patterning method includes shaping a liquid-state sol using a mold by fluid dynamics, gelling the shaped material and removing the mold, thus forming a pattern. For example, a technology designated as micro-moduling in-capillaries (MIMIC) technology is a technique for patterning mesoscopic silica (Kim E, Xia Y, Whitesides G M. 1995. Polymer microstructures formed by moulding in capillaries. Nature 376:581-584; Marzolin et al., *Adv. Mater.* 10:571, 1998; Schuller et al., *Appl. Optics* 38:5799, 1999). This technology can be used in basic patterning of micro-fluid engineering.

However, since the activity of protein can be affected by various factors such as pH, it is important to set conditions for the maintenance of the activity by adding protein from its sol state in the sol-gel process. For this purpose, technologies of patterning a protein by premixing the protein with a sol using various mild conditions such as neutral pH (Kim et al., *Biotechnol. Bioeng.* 73:331 to 337, 2001) have been proposed, but there have been problems in that the sol-gel process rapidly progresses at neutral pH so that cracks may occur or the gel becomes opaque, according to the choice of additives. In addition, there has been a problem in that, because the pretreatment process of mixing the protein with a sol should be carried out, the concentration of spots is likely to be non-uniform.

In prior patents relating to sol-gel processes, there is a patent relating to a sol-gel biochip for improving the reactivity of a biomaterial, in which the sol-gel biochip is fabricated by a sol mixture containing the biomaterial is subjected to a gelation relation on a chip substrate so that the biomaterial is entrapped in the pores of the gel matrix and encapsulated by pores formed on the gel matrix. Also, there are patents relating to a method of fabricating a biochip using a sol-gel process, the method comprising screening a sol composition for sol-gel biochips, which prevents the modification of an immobilized biomaterial or increases the sensitivity of the biomaterial. However, there have been problems in that the fabrication method is complex and in that, in the process of preparing the sol composition, the activity of the biomaterial is reduced or the biomaterial is decomposed.

Accordingly, the present inventors have made many efforts to prevent the decrease in activity and the decomposition of a biomaterial during the preparation of a sol composition and, as a result, have found that, when a specific silicate monomer and additives are mixed sequentially in a specific order and dispensed onto a substrate or when these components are dispensed sequentially directly onto a substrate and gelled, the gelation rate thereof can be delayed compared to that in the conventional fabrication methods, thus making it possible to fabricate a significantly uniform biochip, and the decrease in activity and the decomposition of a biomaterial by the above components can be prevented, thus making it possible to fabricate a biochip having a very high sensitivity, thereby completing the present invention.

SUMMARY OF INVENTION

It is a main object of the present invention to provide a sol-gel material in a kit form so that any person can easily make and analyze a biochip using the kit without needing special equipment or technology.

Another object of the present invention is to provide a method for preparing a uniform biochip without any pretreatment process, by establishing a preparation method in which a specific sol composition obtained by mixing solutions sequentially is dispensed onto a substrate or in which the solutions are dispensed sequentially directly onto a substrate.

Still another object of the present invention is to provide a method of analyzing a target material using said biochip.

To achieve the above object, in accordance with one embodiment of the present invention, there is provided a method of preparing a biochip, the method including the steps of: mixing liquids including SolB1, SolB2, SolB3, SolBH and SolBS, sequentially, in a sol-gel kit (SolB kit); mixing the mixed liquid with a detector material (e.g., protein); and dispensing the mixture onto a substrate.

In accordance with another embodiment of the present invention, there is provided a method of preparing a biochip by gelation of a sol composition without any pretreatment process, the method including the steps of: dispensing onto a substrate a sol composition consisting of SolB1, SolB2 and SolB3; dispensing SolBH onto the substrate; and dispensing onto the substrate a solution containing SolBS, a detector protein and distilled water, and then gelling the dispensed solutions.

With respect to SolB1, SolB2 and SolB3 in the SolB kit, which can be used in the preparation of the biochip, (i) said SolB1 may be at least one first silicate monomer selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS);

(ii) said SolB 2 may be at least one second silicate monomer selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysily)propyl succinic anhydride), N-(3-triethoxysilypropyl)-4-hydroxybutylamide (SIT8189.5), N-(triethoxysilylpropyl) gluconamide (SIT8189.0), pluronic L121 and tetramethyl ammonium hydroxide; and (iii) said SolB 3 may be at least one additive selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000.

In detail, the present invention also provides a method for preparing a biochip by gelation of a sol composition, the method comprising the steps of:

(a) adding to a sol composition comprising SolB1, SolB2 and SolB3 an SolBH solution (solution I) selected from the group consisting of HCl, $H_2SO_4$, $HNO_3$ and $CH_3COOH$;

(b) mixing the solution of step (a) with buffer SolBS and distilled water, and then stabilizing the mixed solution at a temperature ranging from −20° C. to 4° C.; and (c) mixing the stabilized solution of step (b) with a solution containing a biological material which interacts with target biological material, dispensing the mixed solution onto a substrate and gelling the dispensed solution, wherein (i) said SolB1 is at least one first silicate monomer selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS);

wherein (ii) said SolB2 is at least one second silicate monomer selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysily)propyl succinic anhydride, N-(3-triethoxysily propyl)-4-hydroxy butylamide (SIT8189.5) 50%, N-(triethoxysilylpropyl)gluconamide (SIT8189.0), pluronic L121 and tetramethyl ammonium hydroxide; and wherein (iii) said SolB3 is at least one additive selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000.

The present invention also provides a method for preparing a biochip by gelation of a sol composition, the method comprising the steps of:

(a) dispensing onto a substrate a sol composition consisting of SolB1, SolB2 and SolB3 and dispensing SolBH (solution I) selected from the group consisting of HCl, $H_2SO_4$, $HNO_3$ and $CH_3COOH$ onto the substrate onto which the sol composition has been dispensed; and (b) dispensing solution II, comprising buffer SolBS, a biological material which interacts with target biological material and distilled water, onto the substrate onto which the solution I has been dispensed, and then gelling the dispensed solutions, wherein (i) said SolB1 is at least one first silicate monomer selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS);

wherein (ii) said SolB2 is at least one second silicate monomer selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysily)propyl succinic anhydride, N-(3-triethoxysilypropyl)-4-hydroxy butylamide (SIT8189.5), N-(triethoxysilylpropyl)

gluconamide (SIT8189.0) 50%, pluronic L121 and tetramethyl ammonium hydroxide; and wherein (iii) said SolB3 is at least one additive selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000.

The present invention also provides a kit for preparing a biochip, in which the kit is used in said preparation method and includes a first container containing at least one first silicate monomer, SolB1, selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS);

a second container containing at least one second silicate monomer, SolB2, selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysily)propyl succinic anhydride, N-(3-triethoxysily propyl)-4-hydroxy butylamide (SIT8189.5), N-(triethoxysilylpropyl)gluconamide (SIT8189.0), pluronic L121 and tetramethyl ammonium hydroxide;

a third container containing at least one additive, SolB3, selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000;

a fourth container containing SolBH selected from the group consisting of HCl, $H_2SO_4$, $HNO_3$ and $CH_3COOH$; and a fifth container containing buffer SolBS, wherein SolBH selected from the group consisting of HCl, $H_2SO_4$, $HNO_3$ and $CH_3COOH$, buffer SolBS, distilled water and biological material which interacts with target biological material are added sequentially to a sol composition consisting of SolB1, SolB2 and SolB3 so that the sol composition is gelled.

The present invention also provides a biochip, prepared using said preparation method and sol composition, a method of analyzing a target biomaterial using the biochip and a method for analyzing a target biological material, the method comprising a step of adding a sample, which contains the target biological material capable of interacting with the biological material which interacts with target biological material, to the biochip prepared by the method.

BRIEF DESCRIPTION OF THE DRAWINGS

FIG. 2 shows a response to the serum of a HIV patient in spots including five HIV1 antigens (①, ②, ③, ④ and ⑤) markers for diagnosis of HIV1 antibody and they are p24, p31, gp41, gp120 and gp160, respectively).

FIG. 5 is a table showing a comparison of the results of detection carried out using the inventive protein chip and a conventional diagnostic kit with respect to HIV1 patient sera collected at various days after infection.

FIG. 12 shows the results of analyzing an antibody against a specific disease using a protein chip according to the present invention.

DETAILED DESCRIPTION OF THE PRESENT INVENTION AND

Preferred Embodiment

Figure 1:
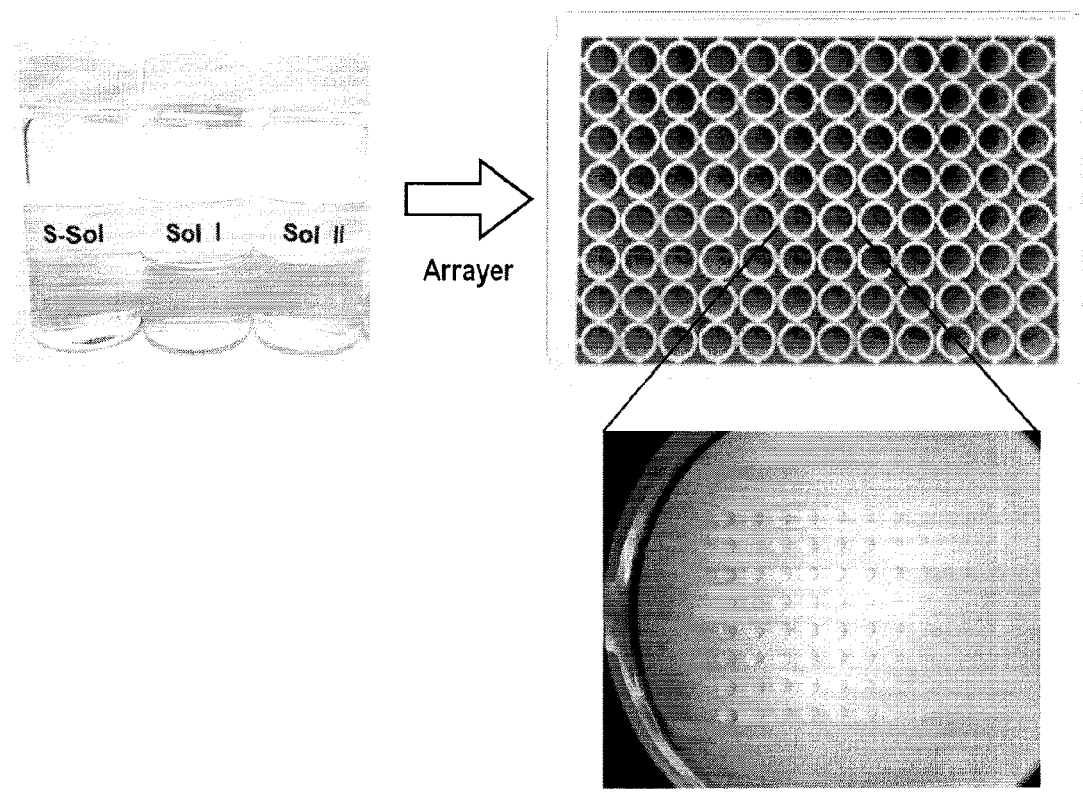
FIG. 1 shows a biochip fabricated by dispensing a mixed sol solution of the inventive sol composition (S-Sol), solution I and solution II using an arrayer.

Hereinafter, the present invention will be described in detail.

In one aspect, the present invention is directed to a method for preparing a biochip by gelation of a sol composition, the method comprising the steps of:

(a) adding to a sol composition comprising SolB1, SolB2 and SolB3 an SolBH solution (solution I) selected from the group consisting of HCl, $H_2SO_4$, $HNO_3$ and $CH_3COOH$;

(b) mixing the solution of step (a) with buffer SolBS and distilled water, and then stabilizing the mixed solution at a temperature ranging from −20° C. to 4° C.; and (c) mixing the stabilized solution of step (b) with a solution containing a biological material which interacts with target biological material, dispensing the mixed solution onto a substrate and gelling the dispensed solution, wherein (i) said SolB1 is at least one first silicate monomer selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS);

wherein (ii) said SolB2 is at least one second silicate monomer selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysily)propyl succinic anhydride, N-(3-triethoxysily propyl)-4- hydroxy butylamide (SIT8189.5) 50%, N-(triethoxysilylpropyl)gluconamide (SIT8189.0), pluronic L121 and tetramethyl ammonium hydroxide; and wherein (iii) said SolB3 is at least one additive selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000.

In the present invention, the SolBH preferably has a concentration ranging from 1 mM to 100 mM.

In the present invention, the SolBS may be at least one solution selected from the group consisting of $NaH_2PO_4$, $Na_2HPO_4$, and $Na_3PO_4$, which has a concentration ranging from 1 mM to 100 mM.

A conventional method of fabricating a biochip using a sol-gel process comprises mixing a sol composition, buffer and a biological material which interacts with target biological material in random order to make a mixed sol solution, subjecting the mixed sol solution to post-treatment such as vacuum process, and gelling the post-treated solution. The methods of mixing the sol composition, buffer and the detector protein include vortexing or ultrasonic mixing, and the methods of making sol-gel shapes include a method of forming spots on a substrate well plate, a method of coating the substrate surface with a sol-gel solution, or a method of pouring a sol-gel solution into a mold and gelling the poured solution.

In such methods, the concentration of the biological material which interacts with target biological material can be different between the spots formed of the mixed sol solution and can vary depending on operators. Also, the possibility of contamination during the mixing process is high, and the viscosity of the sol-gel mixture can be different between samples, and thus the degree of formation of spots, and the shape and size of the spots can be different between samples. For this reason, there has been a need for a method capable of preparing a uniform biochip which can overcome such problems.

According to the inventive method of preparing the biochip, the biochip is prepared using a simple sol-gel process, and the concentration of the biological material which interacts with target biological material is uniform throughout the spots, thus making it possible to detect protein at high efficiency in a more accurate manner.

One embodiment of the inventive method for preparing the biochip will now be described in detail.

First, the first silicate monomer SolB1, the second silicate monomer SolB2 and the additive SolB3 are mixed sequentially to prepare a sol composition.

The SolB1 that is used in the present invention is one or more compounds selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS). In one Example of the present invention, TEOS was used as the first silicate monomer.

The SolB2 that is used in the present invention is one or more compounds selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-3-(triethoxysily)propyl succinic anhydride, N-(3-triethoxysilypropyl)-4-hydroxy butylamide (SIT8189.5), N-(triethoxysilylpropyl)gluconamide (SIT8189.0), pluronic L121 and tetramethyl ammonium hydroxide. In one Example of the present invention, DGS was used as the second silicate monomer.

Also, the SolB3, an additive that is used in the present invention, may be one or more compounds selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000. In one Example of the present invention, PEG was used as the additive SolB3.

The first silicate monomer, the second silicate monomer and the additive can be suitably selected depending on the properties of a biomaterial to be placed in the monomers or on the configuration of a sol-gel chip to be prepared.

The sol composition for preparing the biochip according to the present invention preferably comprises, based on the total volume of the sol composition, about 2-30 vol % of the first silicate monomer, about 2-8 vol % of the second silicate monomer, and 0-5 vol % of the additive. Because the inhalation of the sol composition has a harmful effect on the human body, the preparation of the sol composition is carried out under good ventilation conditions.

The inventive sol composition for preparing the biochip is characterized in that micro-channels are formed due to pores when the composition is gelled. Namely, such channels provide means capable of interacting with a target material to be analyzed. Particularly, the additive (iii) serves to control the size of micro-channels in the gel.

In the present invention, a hand-spotting technique is performed without using any arrayer or a non-contact arrayer is used.

In the present invention, the substrate can be optimized at a temperature higher than dew point before its use, and "a temperature higher than the dew point" is a temperature higher than a temperature at which the dew is formed, and the temperature can be varied depending on humidity condition, for example, the dew point is 8.6° C. when a temperature of atmosphere is 20° C. and relative humidity is higher than 50%, in general, the temperature is 14~17° C. when the humidity is 70~80%.

In the present invention, the substrate can be made of any one selected from the group consisting of polymethylmethacrylate (PMMA), plastic, silicon, and glass, etc.

In the present invention, the biological material which interacts with target biological material can be any one selected from the group consisting of nucleic acid, protein, peptide, low-molecular-weight material, and cell.

In the present invention, the added solution in step (a), the sol mixture can be stabilized by allowing it to be left to stand at a temperature ranging from −20° C. to 4° C. for 30 minutes or more. Also, a container into which the sol composition is to be introduced using an arrayer may be set at 14-17° C. (higher than the dew point temperature at a humidity of 70-80%), and the sol composition may be dispensed at a humidity of 70-80% and at an atmosphere temperature (air temperature) of 20° C., in which the temperature and humidity conditions are optimal for sol-gel transition.

Through such stabilization and optimization processes, the gelation rate of the gel composition can be delayed, whereby the formation of spots can be facilitated, splitting of the spots after gelation can be prevented, and the formation of micro-channels in the chip can be facilitated.

In the present invention, the mixed solution of the sol composition, the SolBH and the SolBS, and the distilled water and the biological material which interacts with target biological material are mixed with each other in a ratio between 3:1:4 and 1:2:8.

In the present invention, the SolBH and the SolBS have a concentration ranging from 1 mM to 100 mM.

In the present invention, the volume ratio of the SolBS:the distilled water:the biological material which interacts with target biological material is between 1:2:1 and 2:5:1.

In the present invention, the buffer is sodium phosphate buffer having a pH ranging from 3 to 8.

In the present invention, the substrate is plasma-surface treated, is etched, or is treated with PDMS, silicate monomer, or polymeric material.

In another aspect, the present invention is directed to a method of preparing a biochip by gelation of a sol composition, the method including the steps of:

(a) dispensing onto a substrate a sol composition consisting of SolB1, SolB2 and SolB3 and dispensing SolBH (solution I) selected from the group consisting of HCl, $H_2SO_4$, $HNO_3$ and $CH_3COOH$ onto the substrate onto which the sol composition has been dispensed; and (b) dispensing solution II, comprising buffer SolBS, a biological material which interacts with target biological material and distilled water, onto the substrate onto which the solution I has been dispensed, and then gelling the dispensed solutions, wherein (i) said SolB1 is at least one first silicate monomer selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS);

wherein (ii) said SolB2 is at least one second silicate monomer selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysilyl)propyl succinic anhydride, N-(3-triethoxysilylpropyl)-4-hydroxy butylamide (SIT8189.5), N-(triethoxysilylpropyl) gluconamide (SIT8189.0), pluronic L121 and tetramethyl ammonium hydroxide;

wherein (iii) said SolB3 is at least one additive selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000;

wherein (iv) said SolBH solution is at least one solution selected from the group consisting of HCl, $H_2SO_4$, $HNO_3$ and $CH_3COOH$, which has a concentration ranging from 1 mM to 100 mM; and wherein (v) said SolBS solution is at least one solution selected from the group consisting of $NaH_2PO_4$, $Na_2HPO_4$ and $Na_3PO_4$, which has a concentration ranging from 1 mM to 100 mM.

In the present invention, the substrate can be optimized at a temperature higher than dew point before its use, and "a temperature higher than the dew point" is a temperature higher than a temperature at which the dew is formed, and the temperature can be varied depending on humidity condition, for example, the dew point is 8.6° C. when a temperature of atmosphere is 20° C. and relative humidity is higher than 50%, in general, the temperature is 14~17° C. when the humidity is 70~80%.

By doing so, when the solutions are dispensed sequentially onto the substrate, the gelation rate of the sol composition can be delayed, whereby the formation of spots can be facilitated, splitting of the spots after gelation can be prevented, and the formation of micro-channels in the chip can be facilitated.

According to the method of the present invention, after the sol composition has been dispensed, SolBH (solution I) selected from the group consisting of HCl, $H_2SO_4$, $HNO_3$ and $CH_3COOH$ is dispensed thereon. Solution I serves to make a pH environment in which the gelation of the sol composition is induced. The concentration of said HCl, $H_2SO_4$, $HNO_3$ or $CH_3COOH$ is preferably 5-30 mM. Solution I serves to adjust the pH of the sol composition to 1-3.

Finally, solution II, comprising the buffer SolBS, the detector protein and distilled water, is dispensed onto the substrate, and the dispensed solutions are gelled.

In the present invention, the buffer SolBS is sodium phosphate buffer having a pH ranging from 3 to 8.

The buffer and double-distilled water have a function of preventing the decomposition of a biomaterial (e.g., protein). At a pH out of a suitable pH range, a biomaterial is likely to decrease its activity or to be decomposed, and the gelation of sol is slower at higher pH and faster at lower pH. For this reason, it is important to adjust the pH of the sol composition so that the gelation of the composition can be performed for a suitable time while preventing the decrease in activity of the biomaterial and the decomposition of the biomaterial. In general, a biomaterial is stably present at a pH ranging from 5 to 8, and for this reason, the buffer is used to prevent the biomaterial from being decomposed due to a pH environment caused by solution I. Buffer that can be used in the present invention is not specifically limited and can be suitably selected by a person of ordinary skill in the art depending on a biomaterial to be added. In one Example of the present invention, sodium phosphate buffer having a pH ranging from 3 to 8 was used as the buffer. Also, as used herein, the term "biological material which interacts with a target biological material" or "biomaterial" refers to a biological material, which can interact with a target material (e.g., target protein), and examples thereof include nucleic acids, proteins, peptides, low-molecular-weight materials, cells, and the like. In order to incorporate this biological material which interacts with a target biological material or biomaterial into solution II, a suitable buffer can be used. Namely, a biomaterial of interest is added to a buffer solution to make a sample solution for detection. For example, if the biomaterial is a protein, PBS buffer (phosphate-buffered saline) may be used, and if an enzyme reaction exists, HEPES, NaCl, EDTA and the like may, if necessary, be used at different concentrations. In one Example of the present invention, an antibody derived from an HIV1 (Human Immunodeficiency virus 1) patient was used as the target biological material (target protein), and a solution of five antigen markers (capable of binding the HIV antibody) in PBS buffer was used as the detector protein.

In the present invention, the volume ratio of buffer SolBS: distilled water:a biological material which interacts with the target biological material in solution II is preferably between 1:2:1 and 2:5:1, and most preferably 1:2:1. For example, solution II may comprise, based on the total volume of solution II, about 20-30 vol % of buffer, about 40-60 vol % of distilled water and about 20-30 vol % of the detector protein. In one Example of the present invention, a mixture of 10 μl of buffer, 20 μl of distilled water and 10 μl of a detector protein-containing solution was used as solution II.

The present invention is characterized in that the sol composition, solution I and solution II are dispensed sequentially in accurate amounts, thereby fabricating a uniform protein chip.

In the present invention, the ratio of the amounts of sol composition:solution I:solution II that are dispensed may be between 3:1:4 and 1:2:8, and is preferably 3:1:4. For example, the sol composition is preferably dispensed in an amount of 25-35 µl, and most preferably about 30 µl. Also, solution I is preferably dispensed in an amount of 5-15 µl, and most preferably about 10 µl. In addition, solution II is preferably dispensed in an amount of 35-45 µl, and most preferably about 40 µl.

In the method of preparing the biochip according to the present invention, the sol composition, solution I and solution II are mixed with each other and then dispensed onto a substrate. In this case, preferably, a hand-spotting technique using a pipette or other tools is performed or a non-contact arrayer is used.

In the present invention, the method does not have a pretreatment process. The pretreatment process can be one or more selected from the group consisting of (i) mixing process of SolB1, SolB2, SolB3, SolBH, SolBS, or biological material which interacts with target biological material; (ii) vortexing process of the mixed solution of (i); and (iii) stabilizing process of the mixed solution of (i) or (ii).

In the present invention, the SolB1, SolB2, SolB3, SolBH, SolBS and the biological material which interacts with target biological material can be contained in the container before the dispensing, and the dispensing can be performed by sucking out through nozzle.

In the present invention, the SolB1, SolB2, SolB3, SolBH, SolBS and biological material which interacts with target biological material can be contained in a mass production cartridge connecting with dispensing nozzle, and a dispensing quantity can be more than 100 times compared with that of dispensing by sucking process through nozzle, thus the method is capable of achieving a mass production.

When the sol composition, solution I and solution II are dispensed sequentially directly onto a substrate without a pretreatment process in order to fabricate a chip, the dispensation can be performed using an arrayer that enables the sol composition, solutions I and II to be dispensed in accurate amounts. In this regard, as the arrayer that can be used to dispense the sol composition, solution I and solution II in accurate volumes, a non-contact arrayer is preferably used.

Arrayers are divided, according to a method of arraying a detector material on a biochip, into a 'contact arrayer' and a 'non-contact arrayer'. The contact arrayer arrays a detector protein on the chip surface using, for example, a pin having a very narrow space therein. In this method, a solution containing the detector protein flows out little by little from the pin and is arrayed on the chip surface while coming in direct contact with the chip surface. This method has an advantage in that it can array a variety of detector proteins within a short time, but it cannot accurately control the volume of solution, and thus the uniformity of the resulting biochip can be reduced. On the other hand, the non-contact arrayer is a method of arraying detector proteins on the chip surface without direct contact by placing a detector protein-containing solution in a thin tube, placing the tube just above the chip surface and applying certain pressure thereto. This method has an advantage in that the volume of solution that is dispensed can be accurately determined. Accordingly, when the sol composition, solution I and solution II are dispensed sequentially without a pretreatment process in order to fabricate a chip, the non-contact arrayer makes it possible to control the volume of each solution, which is dispensed, to a predetermined volume. Therefore, in the present invention, this non-contact arrayer is preferably used.

The sol composition, solution I selected from the group consisting of HCl, $H_2SO_4$, $HNO_3$ and $CH_3COOH$, and solution II (a mixture solution of the biological material which interacts with the target biological material, buffer and distilled water) can be dispensed sequentially onto a substrate well plate using the non-contact arrayer that enables these components to be dispensed in accurate volumes. When another solution is dispensed on small spots that have been dispensed on the surface, the solution will form spot shapes without being spread due to the surface tension of the solution. At this time, surface energy occurring when the solution falls down will be converted to vibration, whereby the flow (convection) of material occurs in the spots so that the two solutions will be easily mixed with each other. Using this principle, the present inventors have designed an automated method of fabricating a sol-gel chip by spotting materials directly on the chip surface without pretreating the materials.

For example, a microarrayer (commercially available from Scienion AG) may be used. Particularly, the use of dew point control technology (Scienion AG) makes it possible to minimize the uncertainty of concentration resulting from the freezing of moisture on the plate surface, thus fabricating spots having a more accurate volume and size. In one Example of the present invention, sciFLEXARRAYER S11 (Scienion AG, Germany) was used as the arrayer.

Namely, in the present invention, the non-contact microarryer is used in the fabrication of the biochip, whereby the biochip can be fabricated in a more convenient manner by dispensing an accurate volume of each solution onto a substrate, and a more uniform biochip can be fabricated, because a pretreatment process of pre-mixing a sol-gel monomer, buffer, a detector protein sample and the like is not required, unlike the conventional method.

Meanwhile, the substrate that is used in the present invention has the property of being transparent after the sol composition has been gelled, and for this reason, the substrate well plate or slide is preferably made of a material that can maintain good transparency. For example, the substrate may be made of a plastic material, such as highly transparent polymethylmethacrylate (PMMA), silicon or glass.

Also, the surface of the substrate that is used in the present invention is used after surface treatment so that a mixed sol solution can be fixed to the substrate when being gelled. One important requirement for the biochip of the present invention is that the mixed sol solution should be fixed strongly to the substrate when being gelled so that the spots should not be detached when these are allowed to react with a target material-containing solution. For this reason, in the analysis of the target material using the biochip, a strong washing process is required after reaction with the target material, and thus in order to withstand this physical force, strong fixation of the spots is essential. For this purpose, it is preferable to use a plastic substrate whose surface has not been treated, a plastic substrate whose surface has been treated with plasma, a glass substrate whose surface has not been treated, a glass substrate whose surface has been treated (e.g., an etched glass substrate), or a silicon chip having a porous structure.

In the present invention, a surface of the substrate can be pretreated with plasma. Otherwise, the substrate of the present invention can be etched or treated with PDMS or a silicate monomer or polymer material in advance.

When the arrayer is used in the fabrication of the biochip according to the present invention, the following attentions should be paid.

First, because the biochip is prepared using a special material (sol) and has the property of being gelled with the passage of time, unlike a DNA chip, it is very important to dispense the sol using the arrayer within the shortest possible time so as to prevent the sol being gelled during the dispensation.

Second, humidity and temperature are important factors. Because the gelation rate and activity of spots formed on the substrate are determined by the humidity and temperature of an environment in which the spots are formed, initial humidity and temperature are very important. Thus, in the fabrication of the biochip using the sol-gel solution, it is very important to preset the temperature and humidity surrounding the arrayer.

In the present invention, the humidity at which the arraying process is carried out is about 50% or above, and more particularly 70-80%, and the preferred temperature at which the arraying process is carried out is about 25° C. or below, and more particularly 10-25° C. (room temperature). Particularly, because high initial humidity is an important factor in the gelation of spots, the humidity should be set at about 80% before arraying. Also, if the temperature is 25° C. or above, the sol is likely to be gelled rapidly, and for this reason, the arraying process is preferably carried out at the lowest possible temperature.

As described above, after temperature and humidity has been preset and a program allowing rapid arraying has been prepared, the solutions are dispensed in order.

In the present invention, the biological material which interacts with target biological material is any one selected from the group consisting of nucleic acid, protein, peptide, low-molecular-weight material, and cell.

In another aspect, the present invention is directed to a kit for preparation of a biochip, the kit including: a first container containing at least one first silicate monomer, SolB1, selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS); a second container containing at least one second silicate monomer, SolB2, selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysily)propyl succinic anhydride, N-(3-triethoxysily propyl)-4-hydroxy butylamide (SIT8189.5), N-(triethoxysilylpropyl)gluconamide (SIT8189.0), pluronic L121 and tetramethyl ammonium hydroxide; a third container containing at least one additive, SolB3, selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000; a fourth container containing SolBH selected from the group consisting of HCl, $H_2SO_4$, $HNO_3$ and $CH_3COOH$; and a fifth container containing a buffer solution, SolBS, wherein SolBH selected from the group consisting of HCl, $H_2SO_4$, $HNO_3$ and $CH_3COOH$, a buffer solution, SolBS, distilled water and biomaterial which interacts with target biomaterial are added sequentially to a sol composition consisting of SolB1, SolB2 and SolB3 so that the sol composition is gelled.

The material of the containers is not limited. The kit may take the form of bottles, tubs, sachets, envelops, tubes, ampoules, and the like, which may be formed in part or in whole from plastic, glass, paper, foil, wax, and the like. The sensor containers may be equipped with a fully or partially detachable lid that may initially be part of the container or may be affixed to the container by mechanical, adhesive, or other means. The kit may comprise an exterior package which may include instructions regarding the use of the components.

In another aspect, the present invention is directed to a method of analyzing a target biomaterial using the biochip prepared according to said preparation method.

More specifically, the present invention is directed to a method for analyzing a target biological material, the method comprising a step of adding a sample, which contains the target biological material capable of interacting with a biomaterial which interacts with target biological material to be detected, to a biochip prepared according to said preparation method.

After the protein chip to be allowed to react with the target biological material has been prepared as described above, it is allowed to react with a solution containing the target biological material. The reaction solution is preferably used in an amount of 50~100 µl in the case of a 96-well chip, and the reaction time is preferably about 1 hour. The target biological material that interacts with a biological material which interacts with target biological material is also a biological material, and examples of the biological material may include nucleic acids, proteins, peptides, low-molecular-weight materials, and cells.

The reaction solution containing the target biological material penetrates into the spots through the microporous structures of the spots and interacts and binds with the protein fixed in the encapsulated structures ($1^{st}$ incubation). After the reaction, in order to analyze the target biological material that did bind to the biological material which interacts with target biomaterial in the spots, the target biological material can be allowed to react with a marker protein to detect the target biological material. In one Example of the present invention, a fluorescent dye (Cy3)-conjugated against the target protein was used ($2^{nd}$ incubation). In this regard, the reaction time is set at 30 minutes, and the amount of the reaction solution is set at 50-100 µl. The above $1^{st}$ and $2^{nd}$ incubation processes are all carried out at room temperature. If the reaction solution containing the target biological material is a mixture containing various materials, a blocking process may be carried out before the $1^{st}$ incubation process in order to prevent non-specific binding to the biological material which interacts with target biological material contained in the protein chip. In this blocking process, a blocking solution such as skim milk, BSA (bovine serum albumin) or IgG may be used.

After each of the $1^{st}$ and $2^{nd}$ incubation processes, a washing process is carried out using a conventional washing buffer. In one Example of the present invention, 0.2% Tween-20-containing PBS buffer was used. In the washing process, a washer for ELISA is used. The $1^{st}$ washing process is repeated 4 times, and the $2^{nd}$ washing process is repeated 4 times. After the washing process has been carried out, a drying process is carried out until the solution is completely removed from each well.

After completion of the drying process, whether an actual reaction occurred can be examined by scanning the well in which the reaction has occurred, using an image scanner that can detect the fluorescent dye. Also, the degree of the reaction can be examined by measuring the darkness of the image using software. Namely, the inventive method of analyzing the target biological material additionally comprises a step of allowing the target material to react with a biomaterial, such as a protein or aptamer labeled with a radioactive isotope, a fluorescent dye or other marker substances. As used herein, the term "aptamer" refers to a small single-stranded oligonucleotide that can specifically bind to biological material which interacts with target biological material with high affinity.

The present invention also provides a detection kit comprising a biochip prepared by said preparation method.

The kit for detection of a detector biological material may take the form of bottles, tubs, sachets, envelops, tubes, ampoules, and the like, which may be formed in part or in whole from plastic, glass, paper, foil, wax, and the like. The sensor containers may be equipped with a fully or partially detachable lid that may initially be part of the container or may be affixed to the container by mechanical, adhesive, or other means. The kit may comprise an exterior package which may include instructions regarding the use of the components.

Hereinafter, the present invention will be described in further detail with reference to examples. It is to be understood, however, that these examples are for illustrative purposes only and are not to be construed to limit the scope of the present invention.

Example 1

Preparation of Each Constituent Solution for Preparing Biochip

20 μl of SolB1, 6 μl of SolB2 and 4 μl of SolB3, each of which has been selected from the components shown in Table 1 below, were mixed with each other to prepare a sol composition. As solution I, 10 μl of SolBH was prepared.

TABLE 1

Components of each solution

| Classification | Components |
|---|---|
| SolB1 | At least first silicate monomer selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS) |
| SolB2 | At least second silicate monomer selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-discuccinimidylcarbonate (DSC), 1,3,5-trimethylbenzene, cetyltrimethylammonium chloride, cetyltrimethylammonium bromide, 3-3-(triethoxysily)propyl succinic anhydride, N-(3-triethoxysilypropyl)-4-hydroxy butylamide (SIT8189.5), N-(triethoxysilylpropyl)gluconamide (SIT8189.0), pluronic L121 and tetramethyl ammonium hydroxide |
| SolB3 | At least one additive selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000. |
| SolBH | At least one selected from the group consisting of HCl, $H_2SO_4$, $HNO_3$ and $CH_3COOH$ |

Meanwhile, 10 μl of at least SolBS selected from the group consisting of $NaH_2PO_4$, $Na_2HPO_4$ and $Na_3PO_4$ and 20 μl of double-distilled water (DDW) were mixed with each other, while 10-200 ng of each of five detector proteins (p24, p31, gp41, gp120 and gp160) capable of interacting with HIV1 antibody was mixed with PBS buffer to prepare 10 of a sample solution. The sample solution was added to the mixture, which was then vortexed for 5 seconds and spun-down to prepare solution II.

TABLE 2

Components of sol composition, solution I, solution II and detector proteins

| | Components |
|---|---|
| Sol composition | SolB1 20 μl, SolB2 6 μl and SolB3 4 μl |
| Solution I | SolBH 10 μl |
| Solution II | SolBS 10 μl and DDW 20 μl |
| | PBS solution 10 μl containing five kinds of HVI antigens |

Example 2

Fabrication of Biochip (1) Preparation of Substrate Well Plate

A commercially available 96-well plate made of PMMA, the surface of which has been treated with plasma, was purchased from SPL Co., Ltd. (Korea).

(2) Fabrication of Biochip (Protein Chip)

To fabricate a protein chip, an arrayer was set at a temperature of 16° C. and a humidity of 80%, and as a source well plate to which the mixed sol solution obtained in Example 1 was to be added, a general 384-well plate was prepared, and as a target well-plate, the 96-well plate made of PMMA, prepared in the above section (1), was prepared. Also, a sciFLEXARRYER S11 arrayer (Scienion, Germany) that dispenses a predetermined accurate volume was prepared.

Then, 30 μl of the sol composition prepared by mixing 20 μl of SolB1, 6 μl of SolB2 and 4 μl of SolB3 in Example 1, 10 μl of SolBH (solution I) and 40 μl a of solution II were added to the source plate of the sciFLEXARRYER S11 arrayer (Scienion, Germany).

Predetermined volumes of the sol composition, solution I and solution II were dispensed sequentially onto the prepared 96-well plate made of PMMA. These solutions were dispensed in an amount of 450 pl or less per spot using nozzle PDC90 (ScienionAG, Germany). The spotting frequency was set at 500 Hz. The size of the formed spots was about 300 μm (8 drops per spot).

Figure 6:
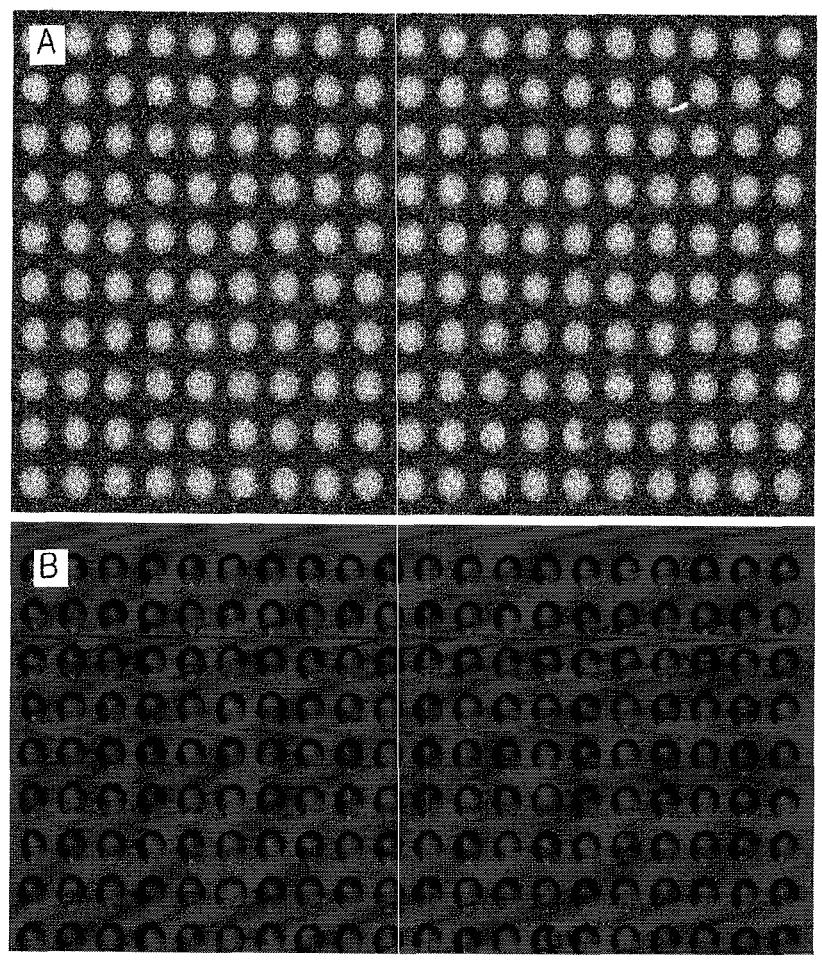
FIG. 6 shows an Axon GenePix scanner photograph (A) and camera image photograph (B) of a chip fabricated using sciFLEXARRYER S11.
Figure 7:
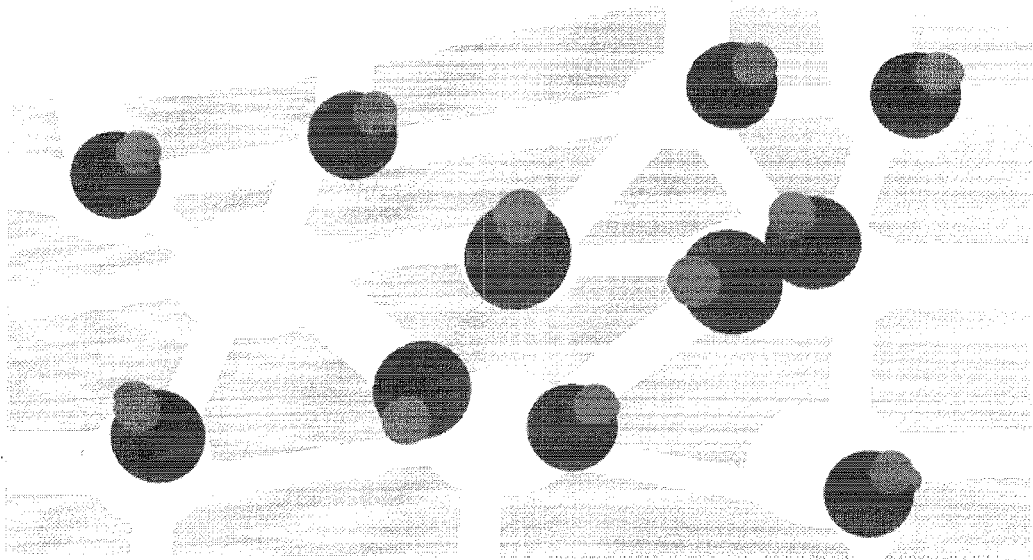
FIG. 7 schematically shows the configuration of the inventive protein chip, which contains detector proteins in encapsulated structures while micro-channels on the surface.

FIG. 6 shows a photograph (A) obtained by scanning an Axon GenePix scanner (Axon) at 532 nm and an image photograph (B) obtained using sciFLEXARRAYER equipped with a camera. The distance (dot pitch) between the spots on the protein chip was 600 μm.

Comparative Example 1

Uniformity Comparison with Conventional Protein Chip

The protein chip according to the present invention was compared with a conventional protein chip in order to examine whether the protein chip of the present invention has a very high uniformity compared to the conventional protein chip.

First, as a control, a protein chip was fabricated according to a known conventional method. A silicate monomer, HCl, DW, SP and a sample solution were mixed in order, and the mixed solution was dispensed onto a source plate using a pin arrayer and spotted on a 96-well plate made of PMMA. As the pin arrayer, OnmiGrid Accent Arrayer (Genomic Solutions, USA) was used.

Also, the image of the protein chip fabricated according to this method was photographed with a digital camera under a microscope, and the image photograph was compared with the image photograph (FIG. 6B) of the protein chip fabricated according to the method of Examples 1 and 2 of the present invention.

Figure 8:
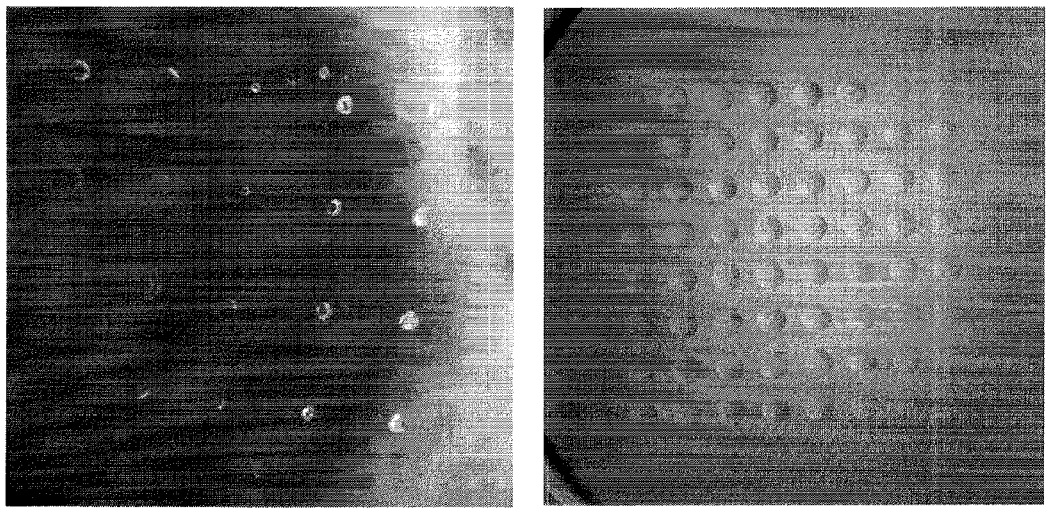
FIG. 8 is a set of photographs showing a comparison of uniformity between the inventive biochip (right) and a conventional biochip (left).

As a result, as can be seen in FIG. 8, in the case of the inventive protein chip fabricated by using the specific sol composition and dispensing solution I and solution II sequentially without a pretreatment process of mixing solutions I and II, the shape and size of the spots were constant, but in the case of the protein chip fabricated according to the conventional method, the shape or size of the spots was not constant. This suggests that the protein chip according to the present invention has a significantly high uniformity compared to the conventional protein chip.

Comparative Example 2

Comparison with the Case in which the Order of Mixing was Changed

The sol mixture obtained by mixing the solutions in the mixing order according to the present invention was compared with a sol mixture obtained by mixing the solutions in an order different from the mixing order of the present invention.

According to the mixing order of the present invention, SolBH, SolBS, distilled water and buffer were added sequentially to the sol composition consisting of SolB1, SolB2 and SolB3 to prepare a mixture. For comparison, a mixture was prepared in the same manner, except that SolBH was added finally. The two mixtures were photographed with a digital camera, and the photographs were compared with each other.

Figure 9:
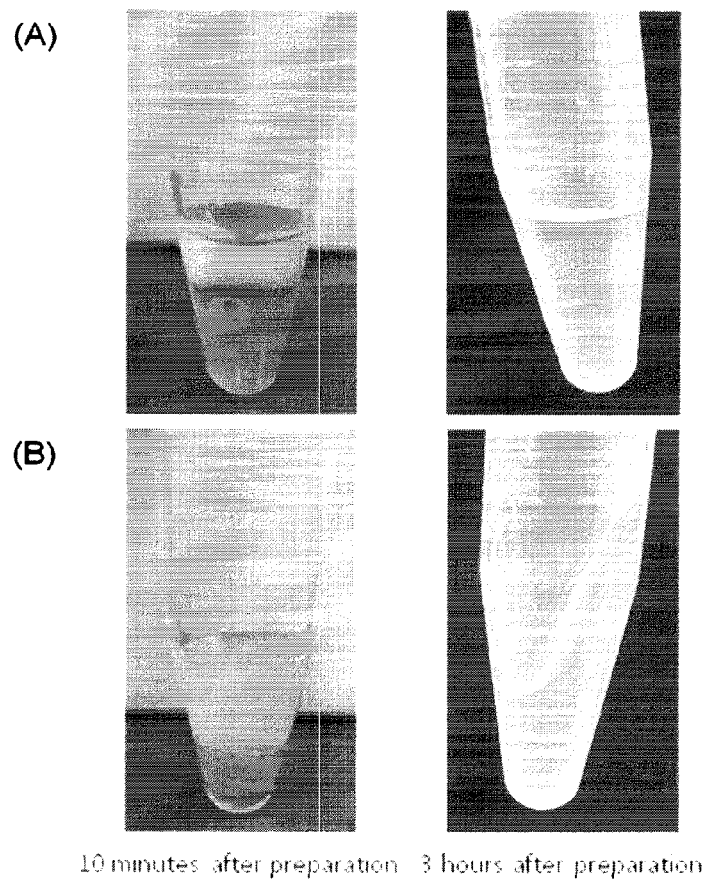
FIG. 9 is a set of photographs showing a comparison of uniformity and gelation rate between the inventive sol mixture (A) and a sol mixture (B) obtained by randomly mixing solutions.

As a result, as can be seen in FIG. 9, when the mixture was prepared according to the mixing order of the present invention, the solutions were easily mixed with each other, and thus they were clear and were not gelled for a long time (FIG. 9A), but when the mixture was prepared according to the different mixing order, the solutions were not easily mixed with each other and were gelled rapidly (FIG. 9B).

Example 3

Analysis and Diagnosis of HIV Using Protein Chip

The protein chip fabricated in Example 2 was blocked using 10% skim milk solution, after which 50 μl of diluted HIV patient serum was added to each well of the chip and primarily incubated at room temperature for 1 hour. After completion of the primary incubation, the serum was removed, and a step of vortexing the chip with 0.2% Tween-20-containing washing buffer in an washer for ELISA for 5 minutes was repeated 4 times (first washing). After completion of the first washing, 50 μl of a dilution of ∂-Human-Cy3 antibody recognizing human antibody (Jackson ImmunoResearch) was added to the chip which was then secondarily incubated at room temperature for 1 hour. After completion of the secondary incubation, ∂-Human-Cy3 was removed, and a step of vortexing the chip with a washing solution in a washer for ELISA for 5 minutes was repeated 4 times (second washing).

After completion of the second washing, each well was dried by allowing it to stand at room temperature for 10 minutes or more, and the spots at which the reaction has occurred were scanned with the laser scanner FUJI FLA-9000 image scanner. Also, the intensity of a fluorescent signal at each spot at which the reaction has occurred was measured using the image analysis program ImageQuant TL, thereby quantifying the reaction and analyzing the degree of the reaction.

As shown in FIG. 2, the five markers (p24, p31, gp41, gp120 and gp160; Abcam Co., Ltd., Fitzerald Co., Ltd.) showed responses to the patient serum, and the negative control chip containing no antigen marker showed no response.

Figure 3:
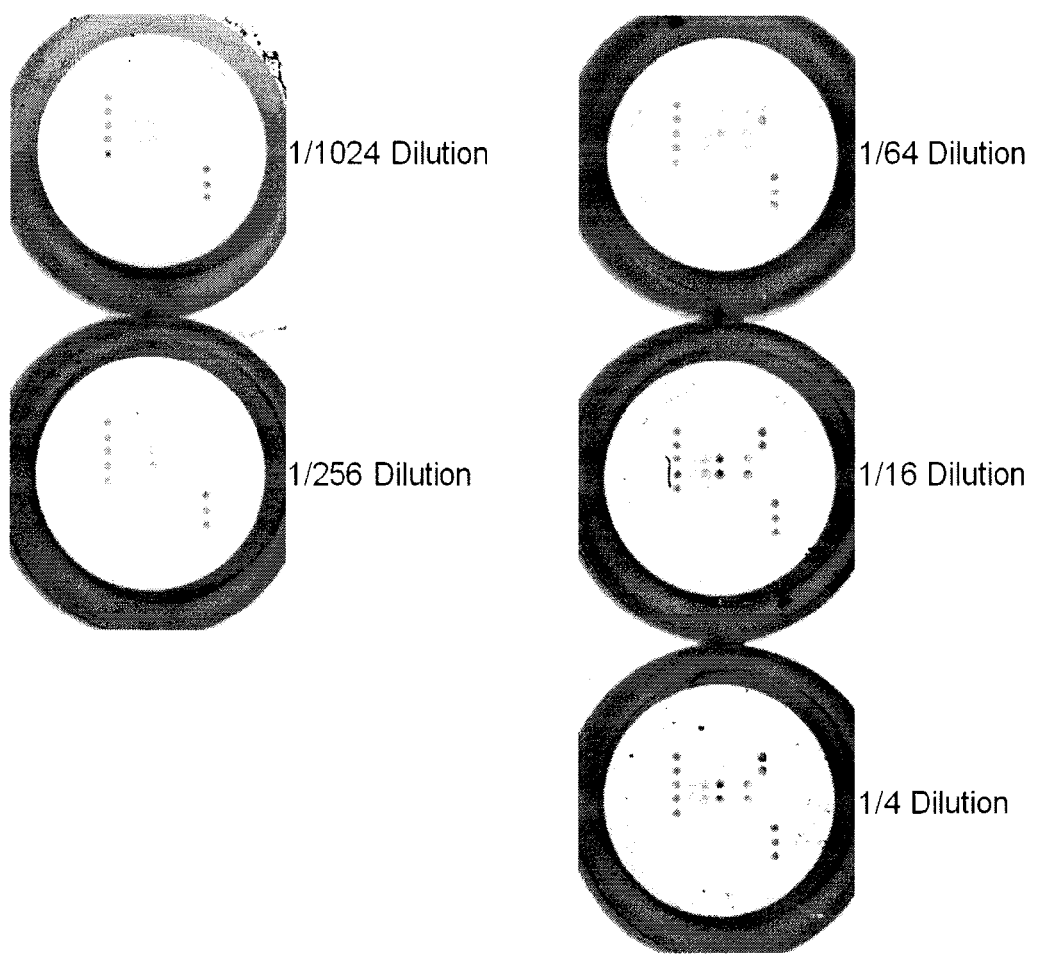
FIG. 3 shows responses to serial dilutions of the serum of a HIV patient in spots including serial dilutions of antigen.

FIG. 3 shows the results obtained by serially diluting 4 each of antigens (p24, p31, gp41, gp120) which reacted most actively among the five antigens and one HIV1 O-type antigen, spotting each of the dilutions in each well and allowing the dilution to react with a HIV standard serum. As expected, it could be seen that the quantification of the reaction was correctly achieved. The above results indicate that the antigen-antibody reaction on the protein chip fabricated in the present invention specifically occurs.

Figure 4:
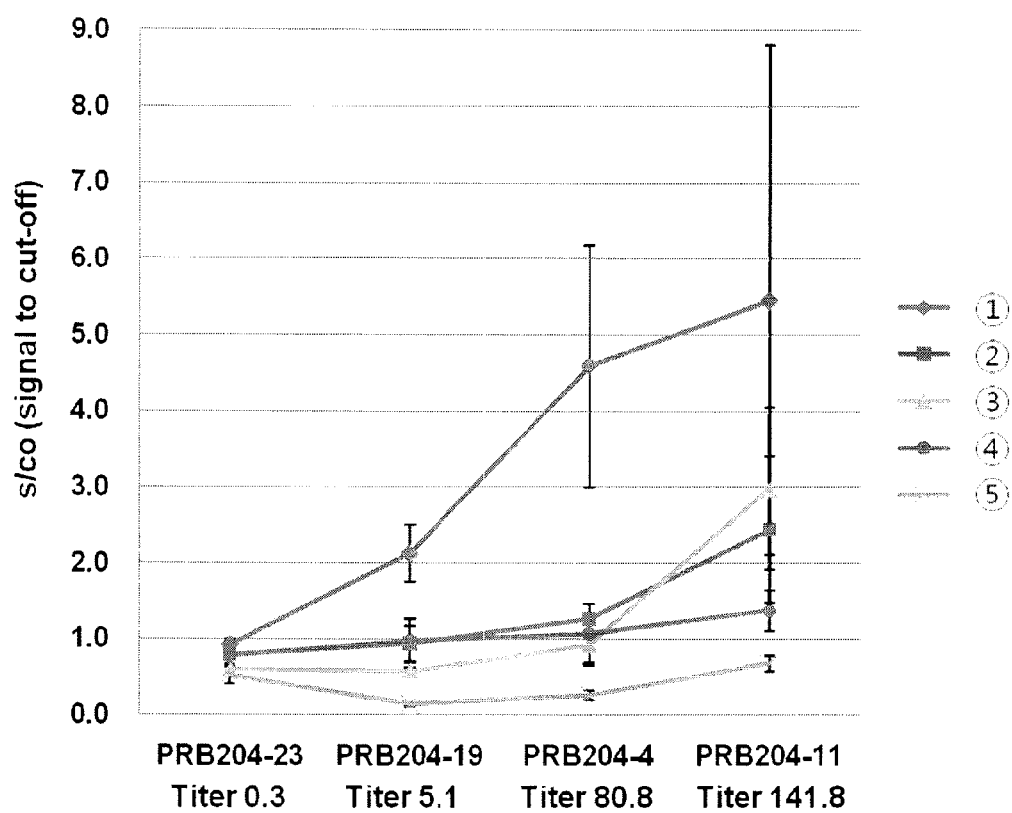
FIG. 4 is a graph showing the results of quantifying a response to a standard HIV serum in spots including each of five HIV1 antigens (①, ②, ③, ④ and ⑤) are markers for diagnosis of HIV1 antibody and they are p24, p31, gp41, gp120 and gp160, respectively).

FIG. 4 shows the results of quantifying a response to the HIV1 standard serum in spots containing each of the five kinds of antigens. The X-axis of FIG. 4 indicates a titer measured when the HIV of the standard serum was diagnosed with a conventional ELISA diagnosis kit, and as can be seen in FIG. 4, the analysis results obtained using the protein chip of the present invention have correlation with the analysis results obtained using the conventional diagnosis chip. The PRB204-00 in X-axis was standard serum sample of patient purchased from Bostonbiomedica, Inc. The name of product was Anti-HIV1 mixed titer performance panel and serial number was PRB204(M). The titer value is s/co value detected by conventional diagnostic kit and the value is signal to cut-off ratio (standard value of positive and negative) and when the value is more than 1, the result is judged to positive. The Y-axis of FIG. 4 indicates the intensity ("signal") of a fluorescent signal in the spots, divided by the intensity ("control") of a fluorescent signal in the negative control spots.

FIG. 5 is a table showing a response to seroconversion panels collected from a HIV-infected patient at various days, in comparison with the conventional diagnosis kit. The serum of patient is standard sample purchased from Bostonbiomedica, Inc. The detection result using conventional diagnostic kit was also provided together with the standard sample.

The name of sample was Anti-HIV1 seroconversion panel V and serial number was PRB922.

As can be seen therein, a few days after the HIV infection, the conventional ELISA diagnosis kit could not detect the HIV infection, but the protein chip of the present invention could detect the HIV infection even at the initial stage of the infection, like the antigen detection kit.

This suggests that the biochip of the present invention has a significantly high sensitivity compared to the conventional antibody diagnosis ELISA kit.

Example 4

Replacement of Western Blot Method by Protein Chip

Western blot and immunostaining method is a technique of finding a specific protein from a mixture of various proteins and is a method of detecting the presence of a specific protein by causing an antigen-antibody reaction using an antibody against the protein to be found.

In general, a process of finding a specific protein by Western blot comprises electrophoresing a protein mixture on SDS-polyacrylamide gel to separate the mixture according to size, transferring the protein to a nitrocellulose or nylon membrane, and finding an antigen against a specific antibody using an antigen-antibody reaction on the membrane to which the protein has been transferred. The antibody that is used in the process is labeled with a radioactive isotope or conjugated with a specific enzyme (e.g., horseradish peroxidase) or a fluorescent dye, and thus makes it possible to visualize the protein to be found.

When the protein chip prepared in Example 2 was used instead of Western blot comprising complex steps, a specific protein in a protein mixture could be found in an easy and simple manner by immobilizing the protein mixture and then assaying the protein mixture with a fluorescent dye-conjugated antibody.

Also, because the electrophoresis of protein is generally carried out in a reduced state, the protein is allowed to bind with an antibody in a denatured state. If a specific antibody only recognizes the native form of protein, the protein cannot be found by general Western blot. However, the sol-gel protein chip according to the present invention makes it possible to immobilize protein in a native form, indicating that the chip of the present invention is more useful.

The following experiments were performed using the sol-gel chip prepared in Example 2.

(1) Experiment of comparison according to the native form and denature form of p24

(i) First, an experiment was carried out using an antibody that binds only to the native form without binding to the denature form. As a result, no band appeared in Western blot, and only the antibody was positive only in the sol-gel chip.

(ii) Western blot analysis and sol-gel protein chip analysis were carried out using an antibody that is against the same antigen but binds to the denature form. As a result, the antibody was positive in both the Western blot and the sol-gel chip.

This suggests that the sol-gel chip according to the present invention can detect both the denature and native forms.

(2) Experiment using *E. coli* crude extract in which p24 protein has been expressed (i) *E. coli* crude extract in which p24 protein has been expressed was fixed to the sol-gel protein chip at various concentrations (Lysates 1, 2 and 3), and then assayed with an antibody against the expressed protein. As a result, the antibody was positive in the sol-gel protein chip (FIG. 10).

(ii) *E. coli* crude extract (N) in which a specific protein has not been expressed was fixed to the sol-gel protein chip and then assayed with the above-described antibody. As a result, as shown in FIG. 10, the antibody was negative in the sol-gel protein chip (FIG. 10).

Figure 10:
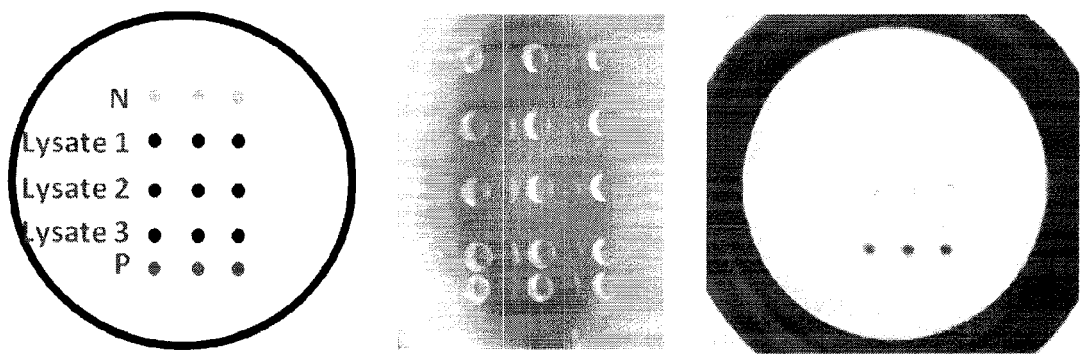
FIG. 10 shows the results of analyzing a specific protein using a protein chip according to the present invention.

In FIG. 10, "N" is a negative control to which *E. coli* crude extract in which a specific protein has not been expressed was attached, Lysate 1 is a group to which *E. coli* crude extract in which a specific protein has been expressed at a concentration of 0.09 ug/ul was fixed, Lysate 2 is a group to which *E. coli* crude extract in which a specific protein has been expressed at a concentration of 0.18 ug/ul was fixed, and Lysate 3 is a group to which *E. coli* crude extract in which a specific protein has been expressed at a concentration of 0.27 ug/ul was fixed. Also, "P" is a positive control to which Cy3 fluorescent material was fixed.

(3) (i) An antibody against p24 protein was fixed to the sol-gel protein chip at various concentrations, and then assayed using a sandwich assay method with *E. coli* crude extract in which p24 protein has been over-expressed. Then, the antibody was allowed to bind to the protein chip and assayed. As a result, the protein was positive in the sol-gel chip (FIG. 11).

(ii) An antibody against an antigen to be detected was fixed to the sol-gel protein chip at various concentrations, and then assayed using a sandwich assay method with *E. coli* crude extract in which a specific antigen has not been expressed. Then, the antibody was allowed to bind to the chip and assayed. As a result, the antibody was negative in the sol-gel chip (FIG. 11).

Figure 11:
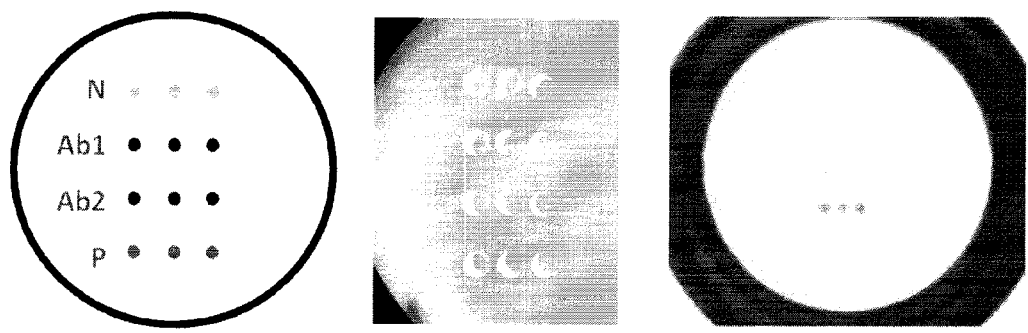
FIG. 11 shows the results of analyzing a specific antigen using a protein chip according to the present invention.

In FIG. 11, "N" is a negative control to which the antibody was not fixed, and Ab1 and Ab2 are was fixed at various concentrations (0.063 ug/ul, and 0.125 ug/ul). Also, "P" is a positive control to which Cy3 fluorescent material was fixed.

(4) (i) Antigens (p24, p31, gp41, gp120 and gp160) against an antibody for a disease (AIDS) to be detected were fixed to the sol-gel protein chip, and then assayed with a material (positive serum) containing a specific antibody, such as a patient serum. As a result, the antibody was positive in the sol-gel chip (FIG. 12).

(ii) Antigens against an antibody to be detected were fixed to the sol-gel chip, and then assayed with a material (negative serum) containing no specific antibody, such as serum. As a result, the antibody was negative in the sol-gel chip (FIG. 12).

Example 5

Detection of Protein or Specific Material Binding to Compound

Figure 13:
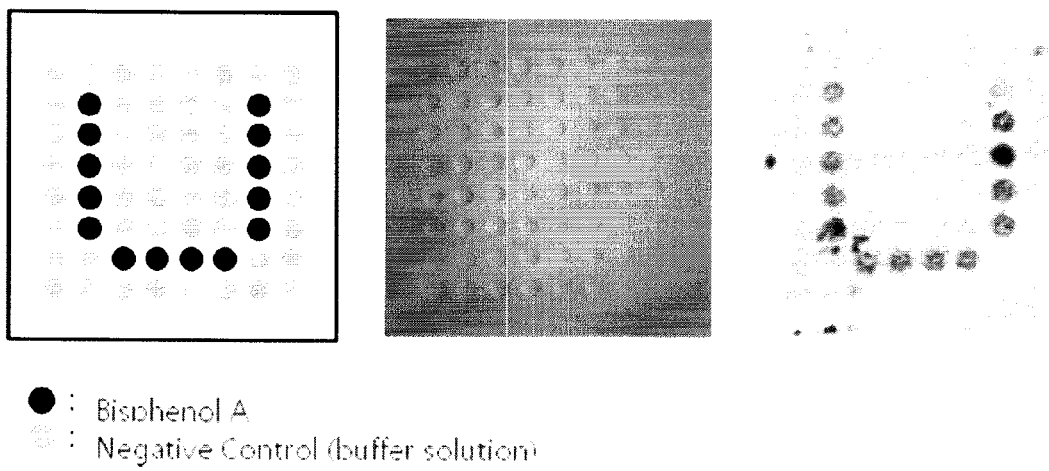
FIG. 13 shows the results of examining the binding between a specific compound (bisphenol A) and a DNA aptamer using a sol-gel chip according to the present invention.
Figure 14:
FIG. 14 is an image of a commercial product comprising a sol-gel protein chip according to the present invention.

As shown in FIG. 13, a specific compound (bisphenol A) was fixed to the sol-gel chip fabricated in Example 2. As a negative control, only a buffer solution that was used to dissolve the compound was fixed to the chip. Also, the chip was analyzed using a fluorescent dye (cy3)-labeled single-stranded DNA aptamer (PCL, Inc.) capable of binding to bisphenol A.

Protein-protein binding can be detected by yeast two-hybrid or immunoprecipitation (IP), but methods capable of easily detecting compound-protein binding or compound-DNA binding are rare. As can be seen in the above experimental results, the protein chip fabricated in Example 2 can fix various materials, including low-molecular-weight materials, such as compounds or DNA, proteins and antibodies, and thus easily detect the binding of various materials.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

INDUSTRIAL APPLICABILITY

As described above, when the biochip is prepared by gelation of the sol composition according to the present invention, the sol composition consisting of SolB1, SolB2 and SolB3, SolBH, SolBS, DW and buffer solution are mixed in order, and then stabilized at low temperature, whereby the gelation rate of the sol composition can be delayed and the stable gelation of the composition can be induced, thus facilitating the dispensation of the sol solution and maintaining the activity of the spots. Also, a uniform biochip can be fabricated in a simple and easy manner by spotting solutions on the substrate surface using an arrayer without a pretreatment process of premixing the solutions.

The invention claimed is:

1. A method for preparing a biochip by gelation of a sol composition, the method comprising the steps of (a) and (b) in sequential order:
    (a) dispensing onto a substrate a sol composition consisting of SolB1, SolB2 and SolB3 in a spot form and dispensing solution I comprising SolBH solution of an acid selected from the group consisting of HCl, $H_2SO_4$, $HNO_3$ and $CH_3COOH$ onto the substrate onto which the sol composition has been dispensed; and
    (b) dispensing solution II, comprising buffer, a biological material which interacts with target biological material, and distilled water onto the substrate onto which the solution I has been dispensed, and then gelling the dispensed solutions,
    wherein the method does not have a pretreatment process, which is one or more selected from the group consisting of (i) mixing the sol composition, solution I and solution II; (ii) vortexing the mixed solution of (i); and (iii) stabilizing the mixed solution of (i) or (ii);
    wherein (i) said SolB1 is at least one first silicate monomer selected from the group consisting of methyltriethoxysilane (MTES), ethyltriethoxysilane (ETrEOS), sodium silicate, tetramethyl orthosilicate (TMOS), tetraethyl orthosilicate (TEOS) and tetramethoxysilicate (TMS);
    wherein (ii) said SolB2 is at least one compound selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysily)propyl succinic anhydride, N-(3-triethoxysilylpropyl)-4-hydroxy butylamide (SIT8189.5), N-(triethoxysilylpropyl)gluconamide (SIT8189.0), pluronic L121 and tetramethyl ammonium hydroxide; and
    wherein (iii) said SolB3 is at least one additive selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350 and PEG8000.

2. The method of claim 1, wherein i) a hand-spotting technique is performed without using any arrayer or ii) a non-contact arrayer is used.

3. The method of claim 1, wherein the SolB1, SolB2, SolB3, SolBH, buffer and the biological material which interacts with target biological material are contained in a container before the dispensing, and the dispensing is performed by sucking out through nozzle.

4. The method of claim 1, wherein the SolB1, SolB2, SolB3, SolBH, buffer and biological material which interacts with target biological material are contained in a mass production cartridge connecting with dispensing nozzle, and a dispensing quantity is more than 100 times compared with that of dispensing by sucking process through nozzle, thus the method is capable of achieving a mass production.

5. The method of claim 1, wherein the substrate is made of any one selected from the group consisting of polymethylmethacrylate (PMMA), plastic, silicon, and glass.

6. The method of claim 1, wherein the biological material which interacts with target biological material is any one selected from the group consisting of nucleic acid, protein, peptide, low-molecular-weight material, and cell.

7. The method of claim 1, wherein the substrate is optimized at a temperature higher than dew point before its use, and the second solution is dispensed onto the substrate at a humidity higher than 50%.

8. The method of claim 1, wherein the ratio of the amounts of the sol composition:the solution I:the solution II that are dispensed is between 3:1:4 and 1:2:8.

9. The method of claim 1, wherein the SolBH and the buffer have a concentration ranging from 1 mM to 100 mM.

10. The method of claim 1, wherein the volume ratio of the buffer: the distilled water: biological material which interacts with target biological material in solution II is between 1:2:1 and 2:5:1.

11. The method of claim 1, wherein the buffer is sodium phosphate buffer having a pH ranging from 3 to 8.

12. The method of claim 1, wherein the substrate is plasma-surface treated, is etched, or is treated with PDMS, silicate monomer, or polymeric material.

13. A method for analyzing a target biological material, the method comprising a step of adding a sample, which contains the target biological material capable of interacting with the biological material which interacts with target biological material, to the biochip prepared by the method of claim 1.

14. The method of claim 13, wherein the target biological material is any one selected from the group consisting of nucleic acids, proteins, peptides, low-molecular-weight materials, and cells.

15. The method of claim 13, further comprising a step of allowing the target biological material to react with a protein, antibody, or aptamer labeled with a radioactive isotope, dye, a fluorescent dye, or luminescent material which can detect the target biological material.

16. A method for preparing a biochip by gelation of a sol composition comprising (a) to (c) in sequential order:
    (a) adding to a sol composition comprising SolB1, SolB2 and SolB3 and solution I comprising SolBH solution of an acid selected from the group consisting of HCl, $H_2SO_4$, $HNO_3$ and $CH_3COOH$;
    (b) mixing the solution of step (a) with solution II comprising buffer and distilled water, and then stabilizing the mixed solution at a temperature ranging from −20° C. to below 4° C.;
    (c) mixing the stabilized solution of step (b) with a solution containing a biological material which interacts with target biological material, dispensing the mixed solution onto a substrate and gelling the dispensed solution;
    wherein (i) said SolB1 is at least one first silicate monomer selected from the group consisting of methyltriethoxysilane (MTES), ethyltriethoxysilane (ETrEOS), sodium silicate, tetramethyl orthosilicate (TMOS), tetraethyl orthosilicate (TEOS), and tetramethoxysilicate (TMS);
    wherein (ii) said SolB2 is at least one compound selected from the group consisting of 3-aminotrimethoxysilane (3-ATMS), diglycerylsilane (DGS), methyltrimethoxysilicate (MTMS), polyglycerylsilicate (PGS), polyvinylacetate, polyvinylpyrrolidone, glyceryl methacrylate, hydroxyethyl acrylate, N,N-disuccinimidyl carbonate (DSC), 1,3,5-trimethylbenzene, cetyltrimethylammonium chloride, cetyltrimethylammonium bromide, 3-(triethoxysilylpropyl succinic anhydride, N-(3-triethoxysilylpropyl)-4-hydroxy butylamide (SIT8189.5) 50%, N-(triethoxysilylpropyl)gluconamide (SIT8189.0), pluronic L121, and tetramethyl ammonium hydroxide; and wherein (iii) said SolB3 is at least one additive selected from the group consisting of aminopropyltriethoxysilane (APTES), 3-glycidoxypropyltrimethoxysilane (GPTMOS), N-triethoxysilylpropyl-O-polyethylene oxide urethane (PEOU), glycerol, PEG200, PEG400, PEG600, PEG1350, and PEG8000.

* * * * *